Patented June 12, 1951

2,557,050

UNITED STATES PATENT OFFICE 2,557,050

PRODUCTION OF JELLIES MADE FROM MIXTURES OF SUGAR AND FRUIT JUICES CONTAINING PECTIN

Nissim J. Hassid, Jerusalem, Palestine

No Drawing. Application October 31, 1947, Serial No. 783,449. In Great Britain October 31, 1946

6 Claims. (Cl. 99—132)

This invention relates to the production of jellies made from mixtures of sugar and fruit juices containing pectin, and more particularly but not solely to products derived from citrus fruits.

The manufacture of such pectin jellies is commonly effected by mixing fruit juice and sugar, together with additional pectin should the fruit juice be deficient in that substance, and concentrating the mixture by boiling until the sugar concentration reaches a predetermined figure, usually of the order of 60–66%, and after adjusting the acidity of the mixture to that at which pectin jellies can form, the mixture is poured into moulds and allowed to cool, when it sets to a jelly. Such jellies are limited in degree of firmness and melting temperature.

I have now ascertained that if the concentration be effected by evaporation at temperatures below boiling point instead of by boiling, it is possible to prepare jellies with high pectin contents, which have much higher melting points and tensile strengths than pectin jellies prepared by the processes commonly employed.

I have also found that while it is customary to strain, filter or otherwise clarify fruit juices used in the preparation of jellies in order that they may be clear and attractive, jellies of attractive appearance and satisfactory clearness can be made by my method from juices which contain a large proportion of flesh, and from fruit pulps. Indeed quite attractive jelly products can be made from pulps comprising the whole of citrus fruits, suitably homogenised.

I have further found that particularly when using fresh citrus fruit pulps which are rich in pectin, it is possible even without using additional pectin, to prepare jellies by my process which are able to withstand baking temperatures without melting, and which can, therefore, be incorporated in cakes and pastries and subjected to the normal baking process.

According to the present invention, a method of preparing a jelly comprises preparing a jelly forming solution in which the jelly forming agents are sugar, pectin and acid, and reducing the water content of the mixture by dividing it into layers of less than 1″ thickness and subjecting the layers to evaporation at below boiling temperature until the mixture sets to a jelly and continuing evaporation if necessary until the jelly has the required sugar percentage which is a minimum of 66% if the jelly is required to have long keeping qualities without addition of preservatives, but may otherwise be lower, the lower limit being determined by two qualifying properties of the jelly product; that it shall have a melting point of over 210° F., and a tensile strength of over 20 grams per sq. cm. after standing at normal temperature for 48 hours. The actual figure for this lower limit of sugar percentage is dependent upon the quantity and quality of the pectin in the jelly product and will vary from mixture to mixture and must therefore be determined by practical trial.

The mixture may be prepared in known manner to contain the appropriate proportions of sugar and pectin, by adding such quantities of each of these substances to the fruit juice or pulp as to give a balanced mixture, which when adjusted in acidity to within the pH range known in the art wherein pectin fruit jellies will form and preferably between pH 2.9 and 3.4, and subjected to evaporation as herein described, shall give a jelly product with the special properties as stated. Since the quantity and quality of pectins in fruit pulps and juices are variable factors, it is essential to determine the formula or recipe for any particular jelly by trial, and indeed the ascertaining of the formula by trial is more easily and certainly carried out than the analyses of the fruit juice or pulp, that would otherwise be necessary. The higher the pectin-sugar ratio, the greater will be the tensile strength of the jelly, and the higher its melting point. A qualifying factor is the percentage of water in the product. With a water content of between 20 and 35%, the product possesses a firmness and consistency suitable for mastication: with lower water contents, the product tends to become tough, while at higher contents it loses firmness and keeping qualities. With these considerations, the formula range for jellies to be made from any given raw materials can be determined according to the following method.

A rough estimate of the jellying power of the fruit juice or pulp is first made according to the method well known in the art and in which a portion of the substance is mixed with an equal quantity of alcohol and the appearance of the mixture noted. A series of mixtures is then made of the fruit juice or pulp with increasing proportions of sugar, pectin being added in quantities of from ¼ to 1% in the event of, and in accordance with, any deficiency of pectin in the fruit substance as indicated by the preliminary jelling test. A suitable range of mixtures comprises 100 parts of juice or pulp with 30, 60, 90, 120 and 150 parts of sugar respectively. These mixtures are adjusted to a pH value of 3.2 which is close to the optimum acidity for the formation of pectin-sugar jellies, after which they are subjected to evaporation at 150° F. and periodically examined. According to the results of this test, further tests may be made, adding more or less pectin and/or sugar as the case may be, until a product with the required characteristics is obtained. The acidity may also be adjusted according to the degree of tartness required in the final jelly, within the limits of the pH range within which pectin-sugar jellies form well. As is well known in the art, at pH values below 3 pectin-sugar jellies are liable to syneresis, and at pH values above 3.4, jelly formation becomes increasingly difficult with increasing pH value.

The fruit juice or pulp may be prepared according to processes known to the art. If the pulp contains coarse pieces of insoluble fruit solids, it should be given a homogenising treatment such as passing through a pulping machine. It may also be given a short boil to soften such solids and assist in extracting pectin therefrom. The juice or pulp is then added to with the requisite amounts of sugar and any pectin as determined by the preliminary tests as described above. The methods of incorporating pectin into jelly forming mixtures are well known in the art, and it is not significant to this process whether any pectin added be in the form of a powder or liquid concentrate. The mixture so made is then adjusted as to pH by the controlled addition of a concentrated solution of an edible acid such as citric or tartaric acid, or of an edible alkali, according as to whether the mixture is of insufficient or of excess acidity. The jelly forming mixture if not previously heated for addition of pectin may then be heated to 200° F. or thereabouts for between 3 and 5 minutes as a sterilizing treatment, after which it is subjected to evaporation in shallow layers at below boiling temperature. The temperature used should be sufficiently high to ensure a practical rate of evaporation, but not so high as to cause undue discoloration or other deterioration of the product. For the preparation of citrus fruit jellies, I have found temperatures of between 140° F. and 160° F. suitable and in a current of air at between these temperatures, ½" to ¾" layers of jelly forming mixtures evaporate down to jellies in from 12-18 hours.

I will now give two examples to illustrate the methods of manufacture of my product, it being understood that these descriptions shall not limit the scope of my invention.

Example 1

Nine parts of fresh orange pulp made from the flesh and juice of oranges with part of the albedo by thin peeling, depipping and pulping, are mixed with one part of fresh lemon pulp similarly prepared and stirred with four parts of sugar until all is dissolved. The mixture is then heated to between 200° F. and 210° F. and held thereat for 4 minutes, after which it is poured into shallow trays and dehydrated in a current of air at 150° F. After about 18 hours, a jelly product containing some 66% sugar is obtained with a melting point of over 230° F., and which can be cut cleanly with a sharp knife into small pieces which can be incorporated in cake mixtures and baked without appreciable change. The yield is about eight parts.

Example 2

One fifth part of powdered pectin mixed with one part of sugar are added slowly to ten parts of boiling apricot juice and stirred until a uniform solution is obtained. The boiling is then stopped and nine parts of sugar stirred in. Concentrated citric acid solution is then added until the pH of the mixture is 3.2 when the mixture is poured into shallow trays and evaporated as in the previous example. After about 12 hours evaporation, a jelly is obtained with similar physical characteristics to those of the jelly described in the first example.

I claim:

1. A method of making a jelly which comprises preparing a jelly forming solution of pectin, sugar and acid, disposing said solution in a shallow layer of less than 1" in thickness and reducing the water content of the solution by evaporating at a temperature lower than the boiling point of the solution, and continuing the evaporation until the jelly so formed has a melting point higher than 210° F. and a tensile strength of over 20 grams per square centimetre.

2. A method as claimed in claim 1 wherein the evaporation is effected by a current of hot air at temperatures between 120° F. and 180° F., at atmospheric pressures.

3. A method as claimed in claim 1, wherein the jelly forming solution is prepared with inclusion of flesh and juice of citrus fruits.

4. A jelly product of shallow layer evaporation below boiling, sugar, pectin and acid being the essential forming constituents, the jelly having a melting point of at least 230° F., and a tensile strength of over 20 grams per square centimetre.

5. A jelly product as claimed in claim 4 embodying citrus fruit pulp.

6. A process of manufacturing a jelly-like product from citrus fruit pulps and sugar materials, comprising adjusting the acidity of said materials to lie within the pH range for the formation of pectin fruit jellies, disposing the materials in a shallow layer of less than 1" in thickness and eliminating water therefrom by evaporating while maintaining a temperature below boiling and forming a firm jelly of high melting point.

N. J. HASSID.

REFERENCES CITED

The following references are of record in the file of this patent:

UNITED STATES PATENTS

| Number | Name | Date |
| --- | --- | --- |
| 1,304,166 | Douglas | May 20, 1919 |
| 2,185,064 | Reich | Dec. 26, 1939 |

FOREIGN PATENTS

| Number | Country | Date |
| --- | --- | --- |
| 370,939 | Great Britain | of 1932 |
| 396,749 | Great Britain | of 1932 |
| 416,305 | Great Britain | of 1932 |

OTHER REFERENCES

Food industries, August 1941; pages 45, 46 and 91, by Baker et al.